(12) United States Patent
Makwarth et al.

(10) Patent No.: US 10,756,959 B1
(45) Date of Patent: Aug. 25, 2020

(54) INTEGRATION OF APPLICATION PERFORMANCE MONITORING WITH LOGS AND INFRASTRUCTURE

(71) Applicant: Elasticsearch B.V., Mountain View, CA (US)

(72) Inventors: Rasmus Makwarth, Copenhagen (DK); Ron Cohen, Copenhagen (DK)

(73) Assignee: Elasticsearch B.V., Amsterdam (NL)

( * ) Notice: Subject to any disclaimer, the term of this patent is extended or adjusted under 35 U.S.C. 154(b) by 0 days.

(21) Appl. No.: 16/382,005

(22) Filed: Apr. 11, 2019

(51) Int. Cl.
*G06F 15/173* (2006.01)
*H04L 12/24* (2006.01)

(52) U.S. Cl.
CPC ............ *H04L 41/069* (2013.01); *H04L 41/22* (2013.01); *H04L 41/5096* (2013.01)

(58) Field of Classification Search
USPC ....... 709/203, 206, 217, 219, 223, 224, 226, 709/228, 230, 232, 238; 707/613
See application file for complete search history.

(56) References Cited

U.S. PATENT DOCUMENTS

| | | | |
|---|---|---|---|
| 8,683,490 | B2 | 3/2014 | Endrikhovski et al. |
| 10,108,352 | B2 | 10/2018 | Carpenter et al. |
| 10,109,086 | B1 | 10/2018 | Bakshi et al. |
| 2005/0216865 | A1 | 9/2005 | Rollin et al. |
| 2007/0226204 | A1 | 9/2007 | Feldman |
| 2008/0120565 | A1 | 5/2008 | Stiso et al. |
| 2010/0049815 | A1 | 2/2010 | Vanecek et al. |
| 2012/0084268 | A1 | 4/2012 | Vijayan et al. |
| 2012/0158454 | A1 | 6/2012 | Saunders et al. |
| 2013/0127877 | A1 | 5/2013 | Blas, Jr. et al. |
| 2013/0254699 | A1 | 9/2013 | Bashir et al. |
| 2013/0346367 | A1* | 12/2013 | Trugman ............... G06Q 10/10 707/613 |
| 2014/0082093 | A1 | 3/2014 | Savage |

(Continued)

OTHER PUBLICATIONS

Grand, Adrien, "Document-Level Attribute-Based Access Control," U.S. Appl. No. 16/212,475, filed Dec. 6, 2018, Specification, Claims, Abstract, and Drawings, 37 pages.

(Continued)

*Primary Examiner* — Quang N Nguyen
(74) *Attorney, Agent, or Firm* — Carr & Ferrell LLP

(57) ABSTRACT

Methods and systems for providing integration of log, infrastructure, and application performance monitoring (APM) data sources for visualization and analysis. An example method includes automatically correlating data sources associated with execution of an application, the data sources associated with the execution including log data from services invoked, infrastructure data, along with application performance monitoring (APM) trace information that indicates in real time at least execution time information for the services; providing a separate user interface (UI) for the each correlated data source for visualization and data analysis; and in response to a selection by a user at one of the separate UIs, causing display of one of the other correlated data sources at another of the separate UIs. The method streamlines debugging. One of the UIs provides for selection of infrastructure metrics for display where example infrastructure includes a plurality of container and hosts.

17 Claims, 10 Drawing Sheets

(56) References Cited

U.S. PATENT DOCUMENTS

| | | |
|---|---|---|
| 2014/0125672 A1 | 5/2014 | Winternitz et al. |
| 2014/0215443 A1 | 7/2014 | Voccio et al. |
| 2014/0365511 A1 | 12/2014 | Burrows et al. |
| 2014/0380237 A1 | 12/2014 | Kroupa et al. |
| 2015/0009234 A1 | 1/2015 | Johnson et al. |
| 2015/0052125 A1 | 2/2015 | Ellis et al. |
| 2015/0070351 A1 | 3/2015 | Tarquini et al. |
| 2015/0127637 A1 | 5/2015 | Cavanagh et al. |
| 2015/0220594 A1 | 8/2015 | Leyba |
| 2015/0269499 A1 | 9/2015 | B et al. |
| 2015/0370839 A1 | 12/2015 | Bareket et al. |
| 2016/0011751 A1 | 1/2016 | Moses et al. |
| 2016/0182328 A1 | 6/2016 | Bhasin et al. |
| 2016/0188663 A1 | 6/2016 | Tsumura et al. |
| 2016/0283085 A1 | 9/2016 | Beausoleil et al. |
| 2017/0075919 A1 | 3/2017 | Bose et al. |
| 2017/0346862 A1 | 11/2017 | Hanhirova |
| 2018/0062955 A1 | 3/2018 | Broda et al. |
| 2018/0113891 A1 | 4/2018 | Jaskiewicz et al. |
| 2018/0121082 A1 | 5/2018 | Zhu et al. |
| 2018/0150384 A1 | 5/2018 | Alaranta et al. |
| 2018/0232194 A1 | 8/2018 | Chen |
| 2018/0239658 A1* | 8/2018 | Whitner .............. G06F 11/3452 |
| 2018/0270122 A1 | 9/2018 | Brown et al. |
| 2018/0276266 A1* | 9/2018 | Diwakar .............. G06F 11/3006 |
| 2018/0287856 A1* | 10/2018 | Whitner .................. H04L 67/10 |
| 2019/0057534 A1 | 2/2019 | Henry et al. |
| 2019/0138995 A1 | 5/2019 | Currin et al. |
| 2019/0272085 A1 | 9/2019 | Radhakrishnan Lakshmi |
| 2019/0317754 A1* | 10/2019 | Mosquera ........... H04L 41/5003 |
| 2020/0021505 A1 | 1/2020 | Vinnakota et al. |
| 2020/0202020 A1 | 6/2020 | Ewing |

OTHER PUBLICATIONS

Ewing, Courtney, "Methods and Systems for Access Controlled Spaces for Data Analytics and Visualization," U.S. Appl. No. 16/226,138, filed Dec. 19, 2018, Specification, Claims, Abstract, and Drawings, 47 pages.

Seifermann, Valentin, "Application Performance Monitoring in Microservice-Based Systems," Institute of Software Technology—Reliable Software Systems, University of Stuttgart, 2017; 85 pages.

* cited by examiner

FIG. 4

INTEGRATION OF APPLICATION PERFORMANCE MONITORING WITH LOGS AND INFRASTRUCTURE

FIELD

The present technology pertains in general to application performance monitoring and more specifically, to providing integration of application performance monitoring with logs and infrastructure for data visualization and analysis.

SUMMARY

This summary is provided to introduce a selection of concepts in a simplified form that are further described in the Detailed Description below. This summary is not intended to identify key or essential features of the claimed subject matter, nor is it intended to be used as an aid in determining the scope of the claimed subject matter.

The present disclosure provides various embodiments of systems and methods for providing integration of application performance monitoring data with log data and infrastructure data for data visualization and analysis.

Various embodiments provide a computer-implemented method (and corresponding system) for providing integration of application performance monitoring data with log data and infrastructure data for data visualization and analysis, the method comprising automatically correlating three data sources associated with execution of an application, the three data sources including log data from one or more services invoked for the execution, infrastructure associated with the execution, along with application performance monitoring (APM) trace information indicating in real time at least execution time information for the one or more services; providing a separate user interface (UI) for at least the logs, infrastructure, and APM trace information data sources for data visualization and analysis; for the separate UIs for at least the infrastructure and APM trace information correlated data sources, providing a menu for selecting one of the other correlated data sources associated with the other UIs; and in response to a menu selection by a user, causing display of the other correlated data source and corresponding UI to the user.

In some embodiments, a method is provided integration of log data, infrastructure data, and application performance monitoring data in a microservices architecture, the method comprising automatically correlating data sources associated with execution of an application, the data sources associated with the execution including log data from services invoked, infrastructure data, and application performance monitoring (APM) trace information that indicates in real time at least execution time information for the services; providing a separate user interface (UI) for each of the correlated data sources for visualization and data analysis; and in response to a selection by a user at one of the separate UIs, causing display of one of the other correlated data sources at another of the separate UIs.

BRIEF DESCRIPTION OF THE DRAWINGS

Embodiments are illustrated by way of example, and not by limitation, in the figures of the accompanying drawings, in which like references indicate similar elements and in which:

FIG. 4 is a diagram illustrating part of a screenshot for example log files UI, according to some embodiments.

DETAILED DESCRIPTION

Figure 1:
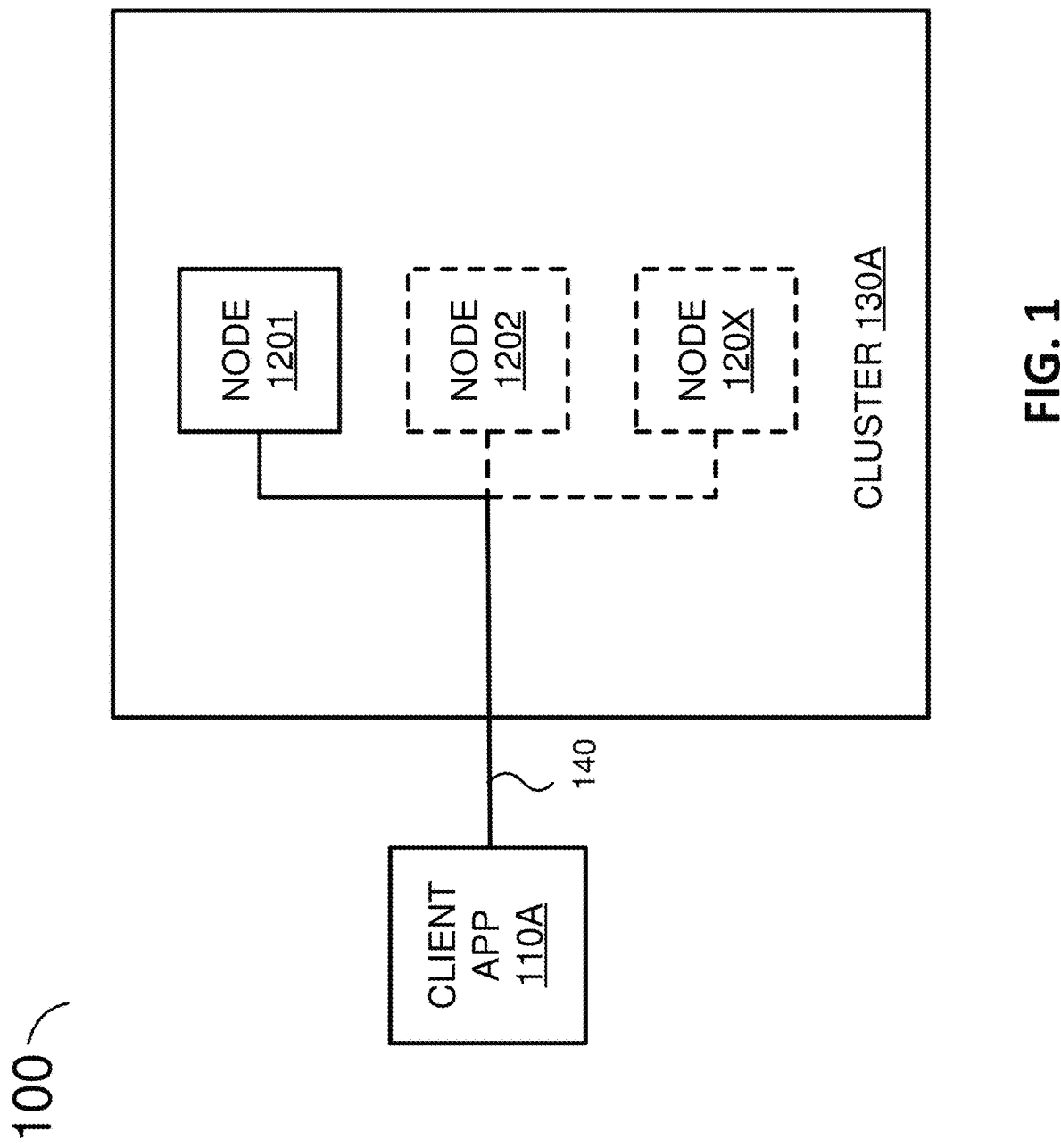
FIG. 1 is a simplified block diagram of a system having a distributed application structure, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The present disclosure is related to various embodiments of systems and methods for providing integration of application performance monitoring with logs and infrastructure for data visualization and analysis. In some embodiments, this functionality is configured to be provided in a distributed, multitenant-capable full-text analytics and search engine environment.

Figure 2:
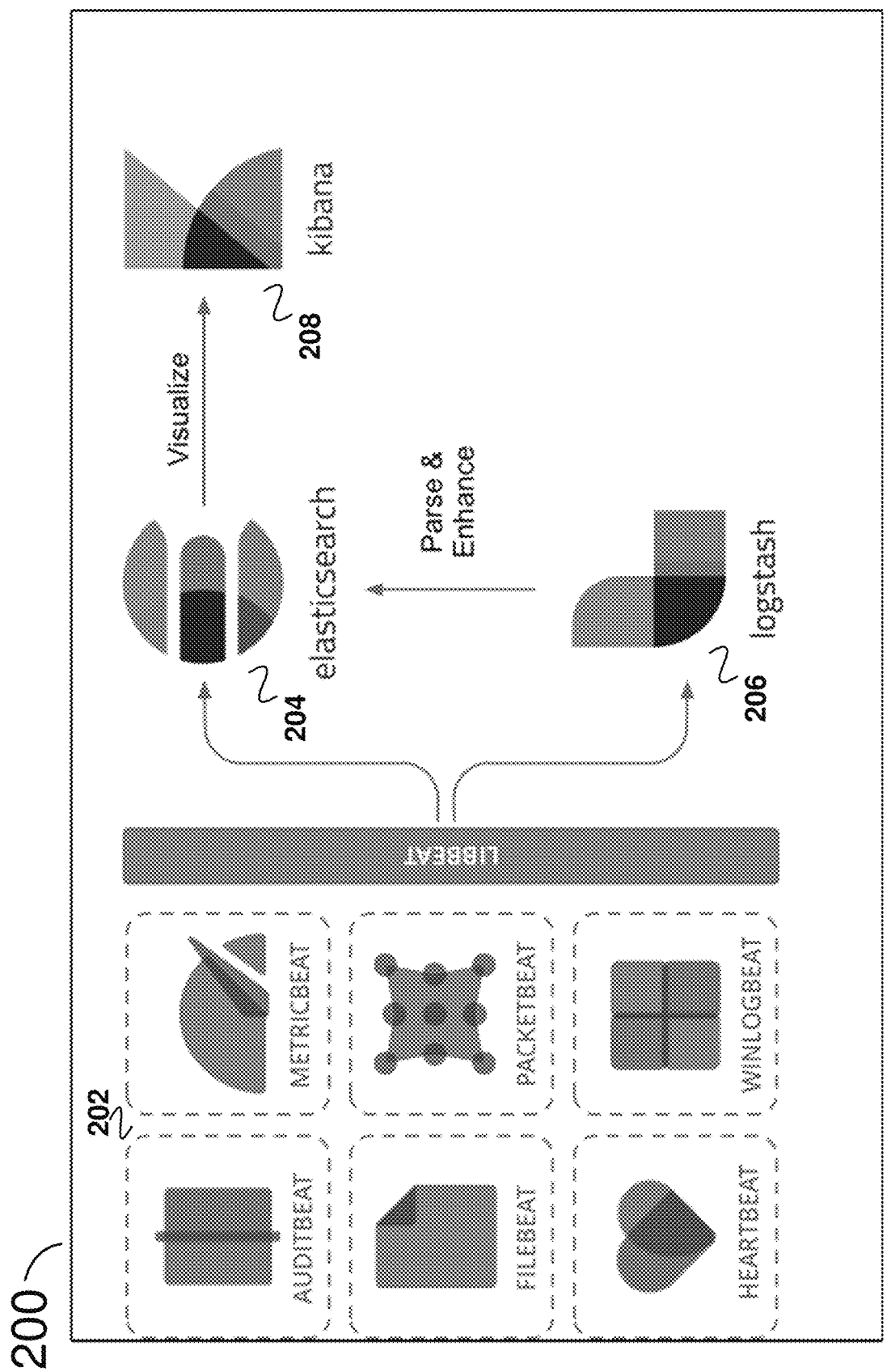
FIG. 2 is an example overall diagram illustrating various aspects and process flow, according to example embodiments.
Figure 3:
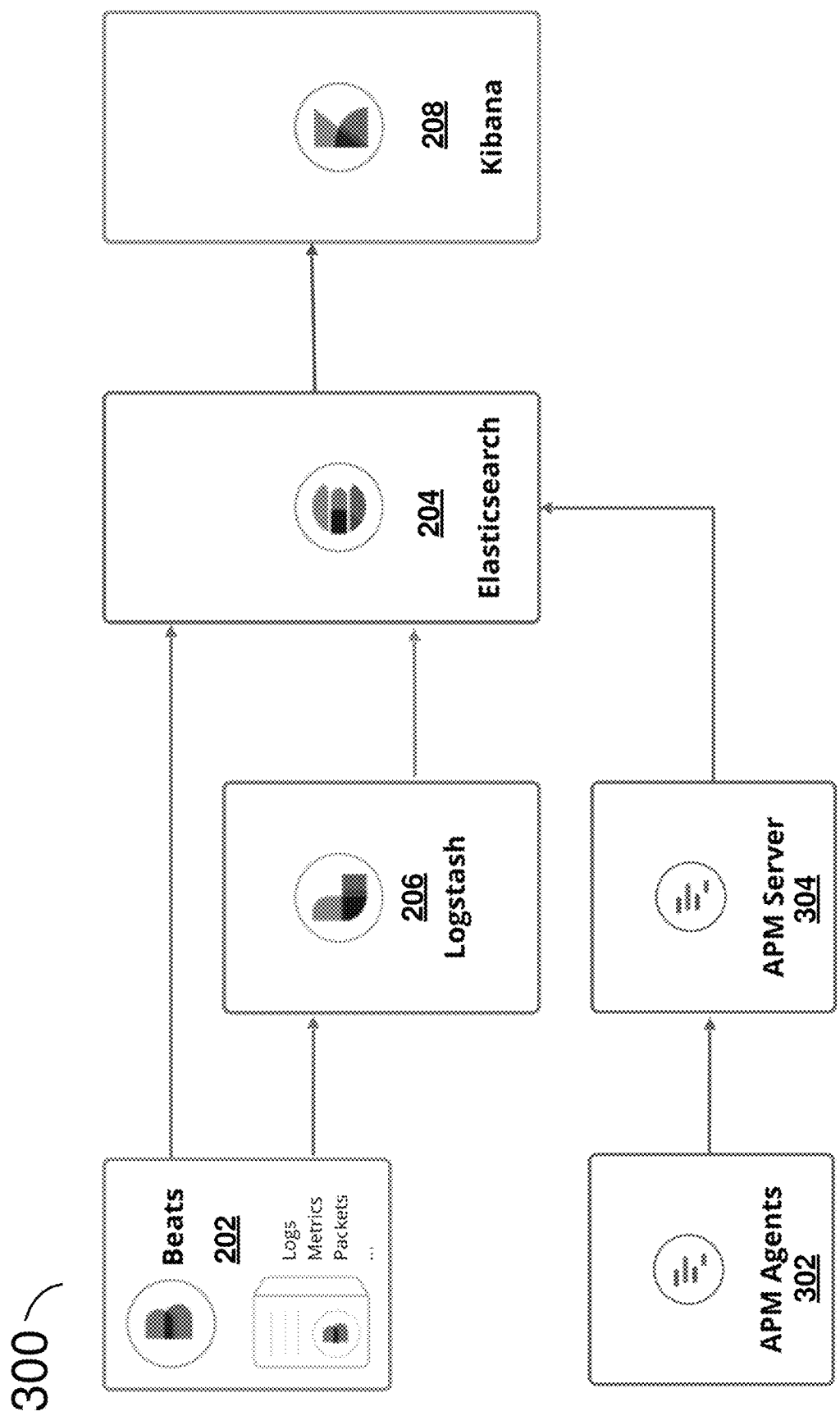
FIG. 3 is an example overall diagram showing various application performance monitoring (APM) aspects within the environment in the example in FIG. 2, according to some embodiments.

FIGS. 1-3 provide an overview of an example overall system and some aspects and components that may be used for some embodiments.

FIG. 1 is a simplified diagram illustrating a system 100 to illustrate certain concepts of the distributed nature and distributed application structure, according to some embodiments. System 100 includes client application 110A, one or more nodes 1201-120X, and connections 140. Collectively, one or more nodes 1201-120X form cluster 130A. When only one node (e.g., node 1201) is running, then cluster 130A is just one node. In various embodiments, a cluster (e.g., cluster 130A) is a collection of one or more nodes (servers) (e.g., one or more nodes 1201-120X) that together store data and provides federated indexing and search capabilities across all nodes. A cluster can be identified by a unique name, such that a node can be part of a cluster when the node is set up to join the cluster by its name. A cluster may have only one node in it. In some embodiments, a node (e.g., one or more nodes 1201-120X) is a single server that is part of a cluster (e.g., cluster 130A), stores data, and participates in the cluster's indexing and search capabilities. A node can be identified by a name which by default is a random Universally Unique IDentifier (UUID) that is assigned to the node at startup. Any number of nodes can be in a single cluster. In some embodiments, nodes (e.g., one or more nodes 1201-120X) can communicate using an application protocol (e.g., Hypertext Transfer Protocol (HTTP), transport layer protocol (e.g., Transmission Control Protocol (TCP)), and the like. Nodes can know about all the other nodes in the cluster (e.g., cluster 130A) and can forward client (e.g., client application 110A) requests to the appropriate node. Each node can serve one or more purposes, master node and data node.

Each of client application 110A and one or more nodes 1201-120X can be a container, physical computing system, virtual machine, and the like. Generally, client application 110A can run on the same or different physical computing system, virtual machine, container, and the like as each of one or more nodes 1201-120X. Each of one or more nodes 1201-120X can run on the same or different physical computing system, virtual machine, container, and the like as the others of one or more nodes 1201-120X. A physical computing system is described further in relation to the exemplary computer system 1500 of FIG. 15. Virtual machines may provide a substitute for a physical computing system and the functionality needed to execute entire operating systems.

When client application 110A runs on a different physical server from a node (e.g., of one or more nodes 1201-120X), connections 140 can be a data communications network (e.g., various combinations and permutations of wired and wireless networks such as the Internet, local area networks (LAN), metropolitan area networks (MAN), wide area networks (WAN), and the like using Ethernet, Wi-Fi, cellular networks, and the like). When a node (of one or more nodes 1201-120X) runs on a different physical computing system from another node (of one or more nodes 1201-120X), connections 140 can be a data communications network. Further details regarding the distributed application structure can be found in commonly assigned U.S. patent application Ser. No. 16/047,959, filed Jul. 27, 2018 and incorporated by reference herein.

Having provided the above details of certain concepts of the distributed application structure described above, the description now turns to further detailing aspects of the present technology according to various embodiments.

Although various example embodiments are described herein with respect to KIBANA and other elements of an integration solution called ELASTIC STACK, the present technology is not so limited.

KIBANA provides for data visualization and exploration, for example, for log and time-series data analytics, application monitoring, and other use cases regarding a user's data on its servers, cloud-based services used, etc.

FIG. 2 is an example diagram of a system 200 illustrating KIBANA connections and flow with respect to other aspects of an integrated solution referred to as ELASTIC STACK. BEATS 202 can capture various items including but not limited to audit data (AUDITBEAT), log files (FILEBEAT), availability (HEARTBEAT), metrics (METRICBEAT), network traffic (PACKETBEAT), and windows event logs (WINLOGBEAT). Although each of those is shown in FIG. 2, BEATS need not include all of those elements in this example. BEATS can send data directly into ELASTICSEARCH 204 or via LOGSTASH 206 (a data-collection and log-parsing engine) where it can be further processed and enhanced before visualizing, analyzing and exploring it using KIBANA 208). Although FIG. 2 includes KIBANA 208 and other particular aspects and components, the present technology is not limited to utilizing some or all of the components and aspects.

KIBANA 208 can provide a powerful and easy-to-use visual interface with features such as histograms, line graphs, pie charts, sunbursts and the can enable a user to design their own visualization, e.g., leveraging the full aggregation capabilities of the ELASTICSEARCH 204 (a distributed, multitenant-capable full-text analytics and search engine). In that regard, KIBANA 208 can provide tight integration with ELASTICSEARCH 204 for visualizing data stored in ELASTICSEARCH 204. KIBANA 208 may also leverage the Elastic Maps Service to visualize geospatial data, or get creative and visualize custom location data on a schematic of the user's choosing. Regarding time series data, KIBANA 208 can also perform advanced time series analysis on a company or other user's ELASTICSEARCH 204 data with provide curated time series user interfaces (UI)s. Queries, transformations, and visualizations can be described with powerful, easy-to-learn expressions. Relationships can be analyzed with graph exploration.

With KIBANA 208, a user may take the relevance capabilities of a search engine, combine them with graph exploration, and uncover the uncommonly common relationships in the user's ELASTICSEARCH 204 data. In addition, KIBANA 208 can enable a user to detect the anomalies hiding in a user's ELASTICSEARCH 204 data and explore the properties that significantly influence them with unsupervised machine learning features. A user could also, e.g., using CANVAS, infuse their style and creativity into presenting the story of their data, including live data, with the logos, colors, and design elements that make their brand unique. This covers just an exemplary subset of the capabilities of KIBANA 208.

It can be provided for the user to share visualizations and dashboards (e.g., KIBANA 208 or other visualizations and dashboards) within a space or spaces (e.g., using KIBANA SPACES), with others, e.g., a user's team members, the user's boss, their boss, a user's customers, compliance managers, contractors, while having access controlled.

FIG. 3 is an example overall diagram 300 showing various application performance monitoring (APM) aspects within the environment in the example in FIG. 2, according to some embodiments. In the example in FIG. 3, a plurality of APM agents 302 are included. In various embodiments, the APM agents are open source libraries written in the same language as a user's service. A user may install APM agents 302 into their service as the user would install any other library. The APM agents 302 can instrument a user's code and collect performance data and errors at runtime. In various embodiments, the collected performance data and errors (also referred to collectively as collected data or just data) is buffered for a short period and sent on to APM Server 304 304. In some embodiments, the APM Server 304 is an open source application which typically runs on dedicated servers. The APM Server 304 may receive the collected data from the APM agents 302 through an application programming interface (API). In some embodiments, the APM Server 304 creates documents from the collected data from the APM agents 302 and store the documents in the full-text search and analytics engine, e.g., ELASTICSEARCH 204 in this example. ELASTICSEARCH 204 can allow the user to store, search, and analyze big volumes of data quickly and in near real time. The documents can include APM performance metrics. As further described herein, KIBANA 208 is an open source analytics and visualization platform designed to work with ELASTICSEARCH 204. KIBANA 208 may be used to search, view, and interact with data stored in ELASTICSEARCH 204. KIBANA 208 may also be used to visualize APM data by utilizing the APM UI.

In various embodiments, the APM agents 302 capture different types of information from within their instrumented applications, known as events. The events may be errors, spans, or transactions. These events may be then streamed to the APM Server 304 which validates and processes the events.

Historically, software applications have been monolithic in that the code was contained within a single application. Modern architectures often include multiple services and multiple applications that talk to each other. This is also referred to as a microservice architecture. Microservices are also referred to herein shortened to services for conciseness. Applications and services may also be referred to herein as just services for conciseness.

As part of serving a web request on a particular website there might be, for example, several of services invoked. There could be two or dozens of services invoked for one request. A web request is also referred to herein as a request or an HTTP request. Part of serving a particular request could involve queries made to back-end services such as to www.google.com, and while waiting for response in a browser, the GOOGLE back-end is getting requests through several services, which could also delay getting a response to the particular request. In various embodiments, distributed tracing allows a user (such as a developer and the like) to follow a request as it comes in and how it automatically propagates through the services. In various embodiments, user can see a visualization of how long the entire request took to be served (e.g., from the incoming request to the time the response was ultimately served). A user may also see, on a per service level, the location of the biggest bottlenecks as part of serving that particular request. The bottlenecks can be related to time and resources used, to name a few. Without distributed tracing with a distributed, multitenant-capable full-text analytics and search engine environment, developers and other users would have to manually determine a first service involved, look into that first service to determine manually what other services are involved and manually call up various metrics, etc. to try to identify a bottleneck; a very time consuming process and sometimes impossible to do for servicing complex requests, for instance. A complex request may invoke hundreds of services, making the aforementioned manual process impossible to perform in the timely manner.

In assessing a bottleneck in processing a request, it is key to identify which services are involved, trace each one, and narrow down which service(s) are the problem, and then delve even more granularly within the service. In various embodiments, instrumentation is also provided on a service level which provides a granular view of exactly what a particular service was spending its time on.

All of the time consuming tasks that a certain service is doing when performing a response to a request may be traced. So within the scope of that one service, methods and systems according to certain aspects provide a very granular view of where time was spent. In addition to this granular breakdown, a user can also be provided with the duration that each service was occupying as part of the entire trace. Thus, both the granular level within a service, and the duration of each service, are some of the aspects provided in various embodiments. For example, the user can be enabled in certain embodiments to visualize which part (e.g., service) of a trace was slowest in terms of the dynamics of the services and why that part (e.g., service) was so slow. The distributed tracing can be structured to function in particular environments and enables a user to analyze performance throughout their microservices architecture all in one view, with that environment. Transactions and spans can form the trace. Traces can group together events that have a common root.

In a debugging production environment, three different sources of information can be invaluable. Log data, infrastructure metrics, and APM data are the holy trinity of sources when it comes to debugging production environments. Historically, developers (and other IT professionals) have these three data sources in different verticals; e.g., having one system to handle all log files, another system to handle all of the infrastructure metrics, and a third system that handles all of the APM data. (Developers and other IT professionals are collectively referred to as just 'developers" for conciseness herein.) This can mean the developers historically would have to buy three different vendor licenses and have increased storage requirements. In addition to the increases license(s) cost and increased storage requirements, a developer historically would have use a manual process; manually going to each of these vertical and determine at each one if there is any interesting debugging information in any of them for a given point in time; which is a tedious process. Moreover, sometimes using these three sources for debugging is impossible because a developer does not have access to one or more of them, or it is just too time consuming to manually stitch together information from the three separate verticals.

In various embodiments, a user can have ready access to all three of these data sources—log data, infrastructure metrics, and APM data—which are very efficiently stored, e.g., in ELASTICSEARCH for one example.

Various embodiments provide methods and systems that make it very easy for users to jump between the three most important data sources of log data, infrastructure metrics, and APM data.

FIG. 4 is a diagram illustrating part 400 of a screenshot from a browser for example log files UI. In various embodiments, these log files can be consumed within a visualization platform. In some embodiments, the platform is KIBANA that provides visualization to the data in ELASTICSEARCH. Although KIBANA and ELASTICSEARCH are included for illustration purposes, the present technology is not limited to use with KIBANA and ELASTICSEARCH. A search field 402 may be provided to enable the user to specify (e.g., input or select) which logs to display, to narrow the logs down to more relevant logs.

Figure 5:
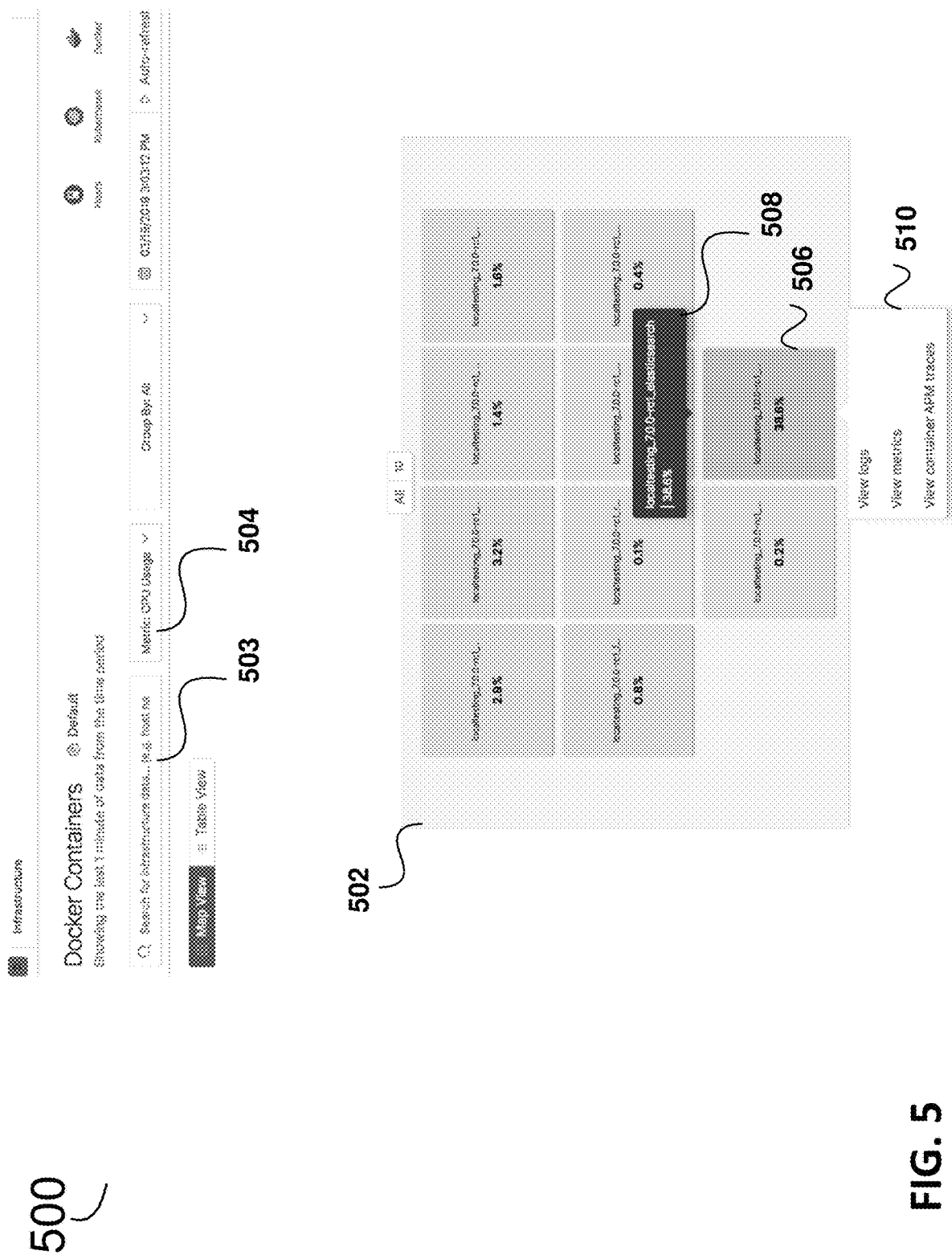
FIG. 5 is a diagram illustrating an example inventory snapshot of the infrastructure, e.g., containers and hosts in this example embodiment.

In various embodiments, another view that is provided is for the infrastructure metrics and can be readily viewed by the user, e.g., in another tab of the same browser (the logs being viewable in a different tab). FIG. 5 is a diagram illustrating at the other browser tab is an example inventory snapshot 500 of the infrastructure, e.g., containers and hosts in an example embodiment. For clarity, the snapshot 500 in FIG. 5 is just a portion of the entire browser tab displayed in this example.

Figure 6:
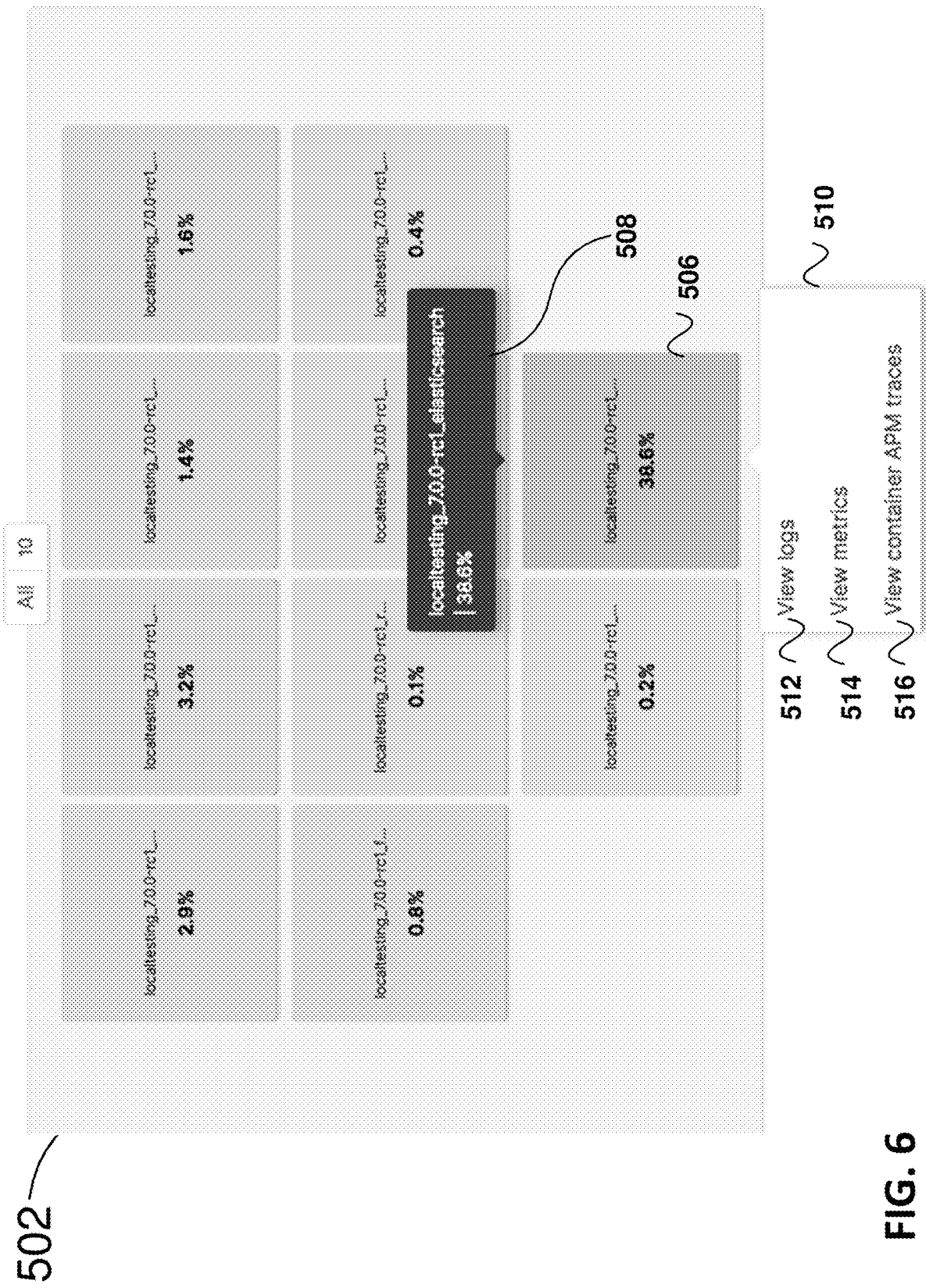
FIG. 6 shows an expanded view of a portion of the diagram in the example in FIG. 5 for easier reference.

Key indicators can be shown for the large number of devices; ten devices are shown in FIG. 5, however, a smaller or larger number of devices may be shown on the UI. In the example in FIG. 5, the key indicator is a metric selected, i.e., "Metric: CPU Usage" identified at 504. That metric is shown in FIG. 5 for each of the ten containers in the portion of the tab shown at 502. As can be seen some container are performing worse than others in regard to CPU usage. FIG. 6 shows an expanded view of portion 502 for easier reference. One of the containers at 506 in FIGS. 5-6, has the highest CPU usage at 38.6% in this example.

In response to user selection of the container 506 in this example, the full identification can be shown as "localtesting_7.0.0-rd_elasticsearch" with the 38.6% CPU usage, The full identification at 508 can also be shown in response to the pointer hovering over the container 506 icon. Also in response to the selection, a menu 510 can be displayed. A search field 503 may be provided to enable the user to specify (e.g., input or select) which containers to display, to displayed desired containers. Although DOCKER containers are noted in FIG. 5, other types of device including, for example, KUBERNETES pods may be used.

FIG. 6 shows the details enlarged for the menu 510 which has items 512 (View logs), 514 (View metrics) and 516 (View container APM traces). If a user such as developer wishes to view the container APM traces for this container 506, the selection can be made of menu item 516 in this UI. In response to the selection on the UI, various embodiments present the container traces in a UI at which the user can view details and drill down to further details to attempt to pinpoint the problem, e.g. excess CPU usage in example in FIG. 5-6.

Figure 7:
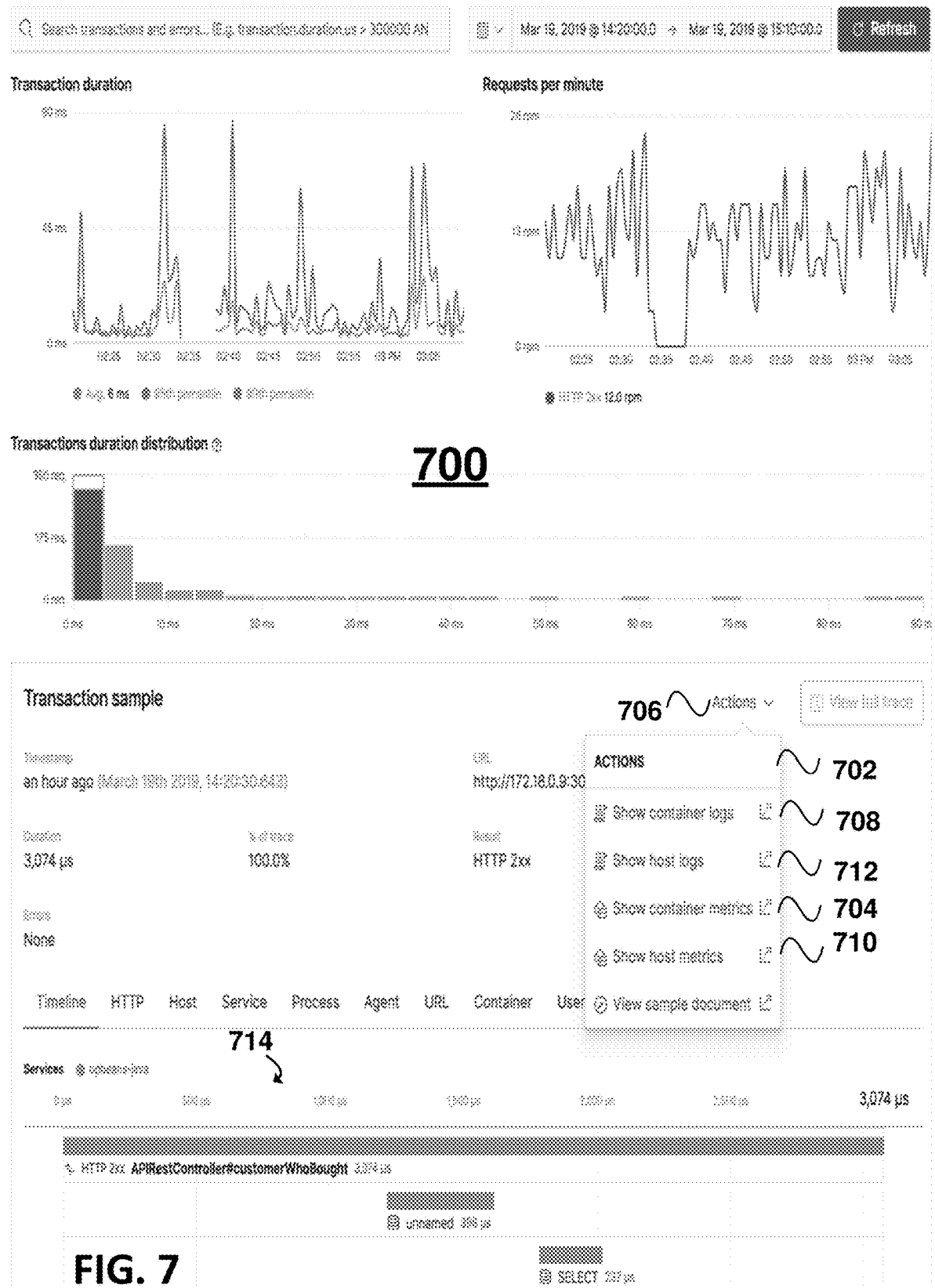
FIG. 7 is a diagram illustrating a screenshot (partial) showing example UI presenting distributed trace information, for example, for a container in FIG. 5-6, according to an example embodiment.

FIG. 7 is a diagram illustrating a screenshot (partial) showing example UI 700 presenting distributed trace information, for example, shown in response to "View container APM traces selected from the menu in FIG. 6 for the selected container in FIG. 5-6, according to an example embodiment. For clarity, FIG. 7 shows just part of a web browser tab. Diagram shows on the UI 700 (also referred to herein as the APM UI) the type of distributed trace information for trace 714 which could be shown for the container in FIGS. 5-6 exhibiting excess CPU usage, to greatly aid a user in debugging. It should be appreciated that the APM UI could be the viewed first and then the container logs or container metrics, etc. could be selected for viewing using the menu 702 as described further below.

The trace information provides insights to the user in a waterfall breakdown showing execution times for various associated executed services. Further details regarding distributed traces and associated data is found in U.S. patent application Ser. No. 16/381,997, filed Apr. 11, 2019, entitled "Distributed Tracing for Application Performance Monitoring" and incorporated by reference in its entirety herein.

For example, the user can look on the UI 700 to see how at a particular time the machines were performing to determine the cause of a slowdown/bottleneck. In various embodiments, the UI and information presented enables the user to select a trace that appears slow based on execution time to help debug the code, e.g., determine if there are problems with the database queries, the code itself, or outside factors. A trace might be slow due to issues with the container it was served from, not the code itself. Such an outside factor could be that the machine on which the transaction is being executed is overwhelmed with traffic, causing the slowdown. If it is not apparent from the information in the APM traces and other information on the UI 700, various embodiments enable the user to select various action.

In various embodiments, an APM UI provides integration between the APM, Logging and Infrastructure functionality. When looking at a trace in the APM UI, a user can now quickly jump to the host or container metrics and logs by clicking an Actions menu (e.g., Actions menu 702 in FIG. 7)

For example, various embodiments enable the user to jump to viewing the container metrics for the time at issue, by selecting actions at 706 for the trace. The actions may be predefined. In response to the selection, the Actions menu 702 can be shown, on which an action "Show container metrics" at 704 can be chosen to view metrics for the container at the relevant point in time. Other example actions that may be provided on menu 702 include selectable action including show container logs at 708, show host logs at 712, show container metrics at 704, show host metrics at 710, according to this example embodiment.

For one example, the "Show container metrics" selection at 704 can show container metrics (see FIG. 8 described further below) that this particular trace (and particular span selected within the trace) was recorded on and enable the user to jump to the particular time of interest.

In various embodiments, an APM UI provides integration between the APM, Logging and Infrastructure functionality. When looking at a trace in the APM UI, a user can now quickly jump to the host or container metrics and logs by clicking an Actions menu.

Figure 8:
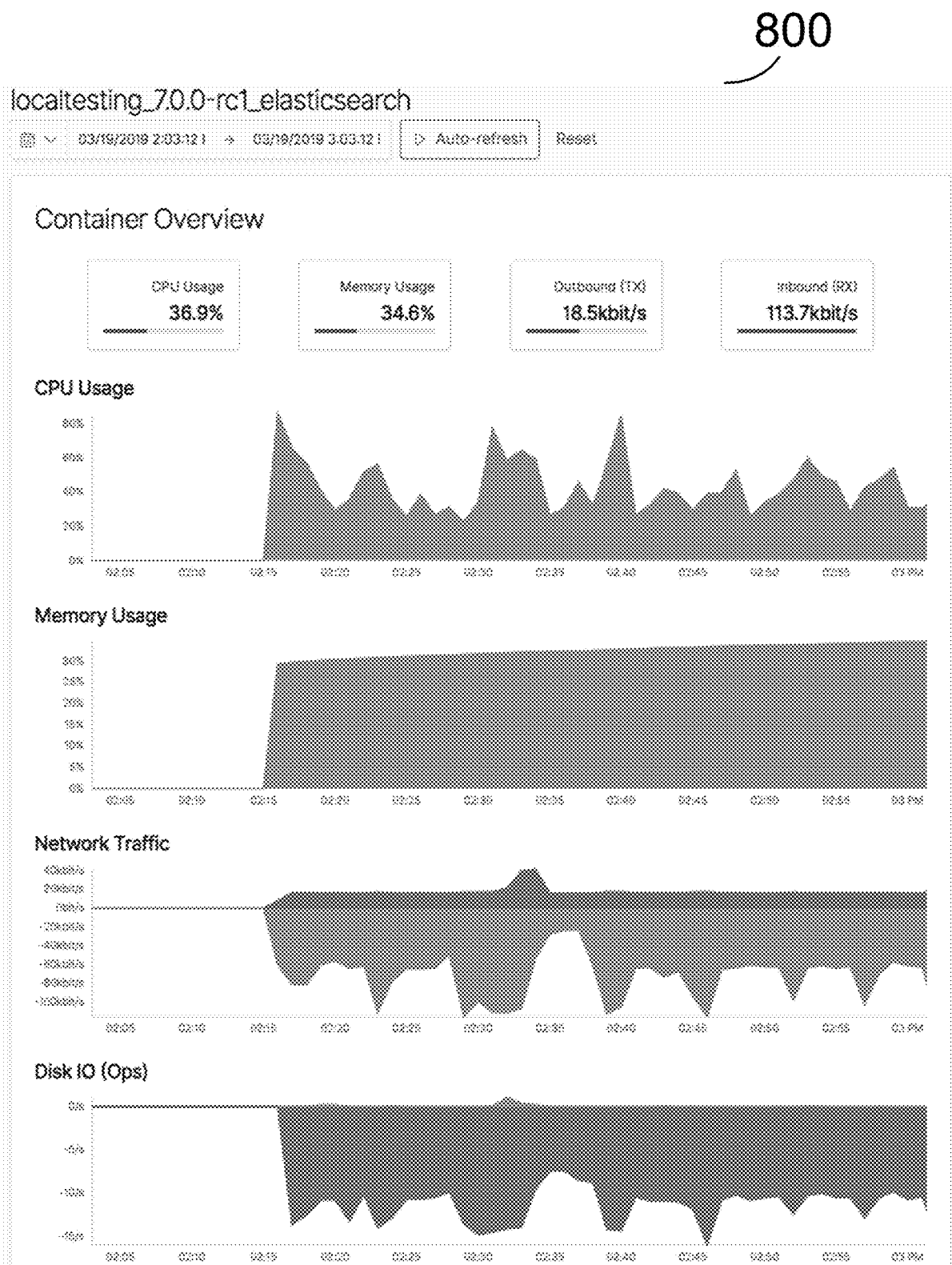
FIG. 8 is a diagram illustrating a screenshot (partial) showing an example UI including graphs for various container metrics, according to an example embodiment.

FIG. 8 is a diagram illustrating a screenshot (partial) showing an example UI 800 including graphs for various container metrics for a particular container, according to an example embodiment. In the example in FIG. 8, the container metrics are shown for a window of time and include graphs for CPU usage, memory usage, network traffic, and disk I/O over time within the relevant time window. A user might then determine the cause of the problem based on viewing the metrics shown. However, the user may also need to view the container logs (and/or host logs) that were generated during this time in order to pinpoint the problem.

Referring back to FIG. 7, in various embodiments, at the APM trace UI 700, show container logs and show host logs can be selected at 708 and 712 respectively. in this example. In response, a log viewer can show the corresponding log. In various embodiments, the log viewer is as shown in the example in FIG. 4, but the log viewer may also be filtered down in some embodiments by the relevant time and the selected container ID for which the particular APM trace was served. In response to the request to filter, the relevant log messages are shown to the user for the selected container ID and the time relevant for the selection, according to some embodiments.

Certain fields in the log UI, e.g., UI 400, may be linkable to aid in debugging by enabling a user to quickly jump between different UIs/views. For example, the trace.id field may be linked to the distributed tracing UI view (e.g., UI 700 in FIG. 7). Similarly, the container.id field may be linked to the relevant container metrics in the infrastructure UI (e.g., UI 800 in FIG. 8). In addition, the host.hostname field may be linked to the relevant host metrics in an infrastructure UI (alternatively, the host metrics are selectable via 710 in FIG. 7). These are merely nonlimiting example, other fields may also be linkable and thus selectable by a user, in response to, an automatic jump is made to an associated UI/view. Having a trace ID attached to log messages, for example, can enable a user to select (e.g., click on or otherwise actuate) the trace ID in the log messages (e.g., log UI 400) and in response, the UI/view automatically jumps straight to the corresponding actual trace. The method in some embodiments works similarly for container IDs or the host name to jump to a corresponding infrastructure view.

Methods and systems in various embodiments thus can show APM data, relevant infrastructure metrics, and relevant log message, all in response to just a few selections by a user on a UI (or multiple UIs) presented via a web browser. Having logs, metrics, and APM traces stored and indexed, according to various embodiments, provides several advantages. UIs are also configured such that method and systems according to various embodiments enable a user to view corresponding information for data sources like infrastructure metrics, logs and traces enabling the user to debug the root cause much faster. This provides substantial advantages over the user having to log into three different systems (one for APM traces, another for infrastructure metrics, and another for log messages) and to have to do the correlations manually. In addition to various embodiments being configured to provide automatic correlating in response to user inputs, various embodiments eliminate the increased license(s) cost and increased storage requirements that are historically required for the manual process of going to each of these vertical for debugging. Having all of the logs, metrics, APM, and distributed tracing all together enables a user to use all of the analysis and visualization tools across all of their data. These are just some of the advantages described herein.

In various embodiments, a common schema is provided that aids in automatically doing the correlations of data from sources such as logs, metrics, and various analytics by providing a common data model. For this common schema, data may be structured as a key and a value. For example, a particular container ID includes a particular key and value and if the system is configured to align on all the keys and values across all the elements a user wants to investigate, it becomes easier to link around to the different elements. This enables a user to take advantage of the common schema across certain data sources and create their own custom actions, in some embodiments. This can enable a user to much more easily correlate across data sources of particular interest to the user, e.g., those of interest for debugging a particular problem). The custom actions can be in addition to or in place of the predefined actions, e.g., predefined actions at actions menu 702 in FIG. 7, and can provide a more meaningful correlation for particular debugging. Under the common schema, metrics, logs, and APM data (and, in some embodiments, any data that has shifted in ELASTICSEARCH through official components) all refer to a container in the same way, all refer to an IP address in the same way. In embodiments with the common schema implemented, if a first user wants to look at data sources that were generated by a second user on a certain IP address, the first user will be viewing the same fields across all the data, e.g., for fields that are part of the common schema.

Figure 9:
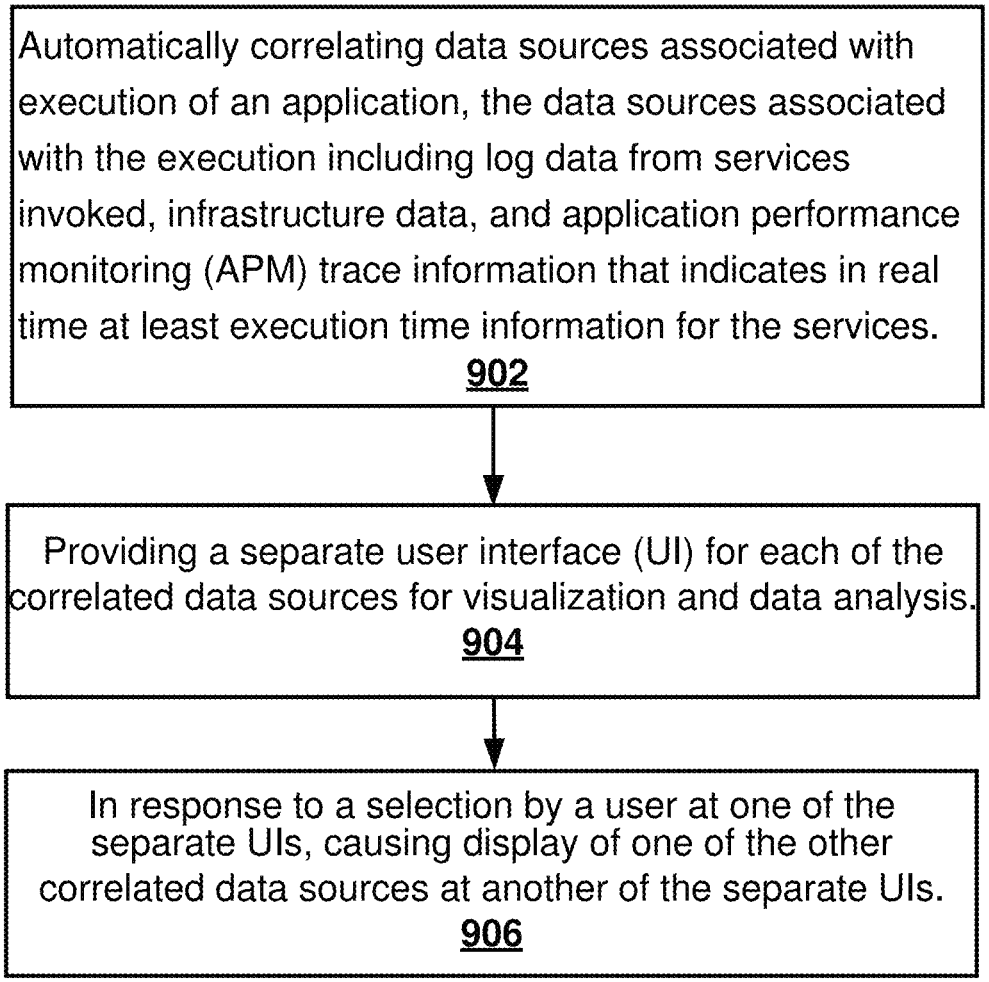
FIG. 9 is a flow diagram of a method, according to an example embodiment.

FIG. 9 is a simplified flow diagram of a method 900, according to an example embodiment. Operation 902 includes automatically correlating data sources associated with execution of an application, the data sources associated with the execution including log data from services invoked, infrastructure data, and application performance monitoring (APM) trace information that indicates in real time at least execution time information for the services, as described further herein. In some embodiments, this operation includes automatically correlating three data sources associated with execution of an application, the three data sources including log data from one or more services invoked for the execution, infrastructure associated with the execution, along with application performance monitoring (APM) trace information indicating in real time at least execution time information for the one or more services, as described further herein.

Operation 904 includes further providing a separate user interface (UI) for each of the correlated data sources for visualization and data analysis, as described further herein. In some embodiments, this operation includes providing a separate user interface (UI) for at least the logs, infrastructure, and APM trace information data sources for data visualization and analysis; and for the separate UIs for at least the infrastructure and APM trace information correlated data sources, providing a menu for selecting one of the other correlated data sources associated with the other UIs, as described further herein.

In operation 906, in response to a selection by a user at one of the separate UIs, causing display of one of the other correlated data sources at another of the separate UIs, as described further herein. In some embodiments, this operation includes, in response to a menu selection by a user, causing display of the other correlated data source and corresponding UI to the user, as described further herein.

Figure 10:
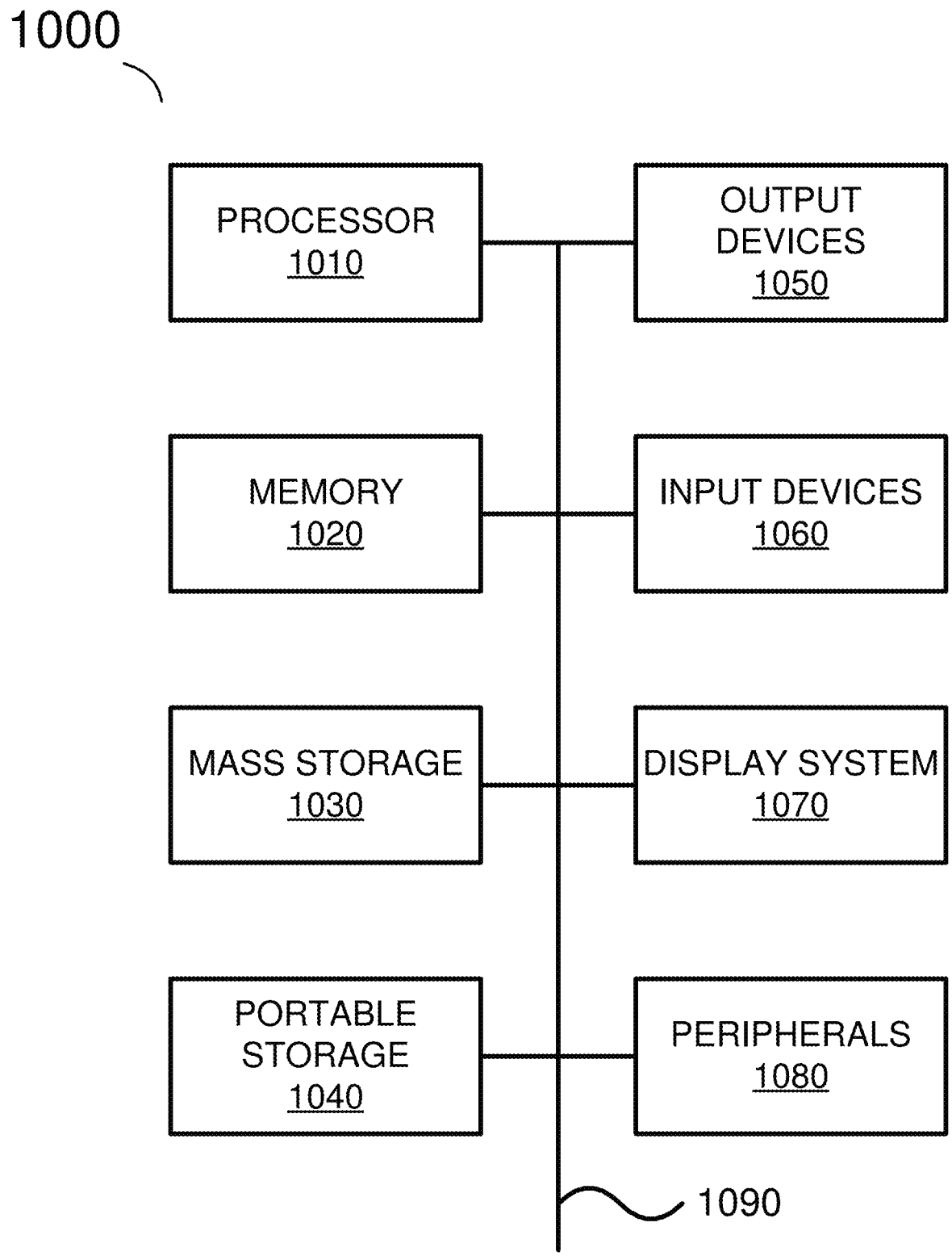
FIG. 10 is a simplified block diagram of a computing system, according to some embodiments.

FIG. 10 illustrates an exemplary computer system 1000 that may be used to implement some embodiments of the present invention. The computer system 1000 in FIG. 10 may be implemented in the contexts of the likes of computing systems, networks, servers, or combinations thereof. The computer system 1000 in FIG. 10 includes one or more processor unit(s) 1010 and main memory 1020. Main memory 1020 stores, in part, instructions and data for execution by processor unit(s) 1010. Main memory 1020 stores the executable code when in operation, in this example. The computer system 1000 in FIG. 10 further includes a mass data storage 1030, portable storage device 1040, output devices 1050, user input devices 1060, a graphics display system 1070, and peripheral device(s) 1080.

The components shown in FIG. 10 are depicted as being connected via a single bus 1090. The components may be connected through one or more data transport means. Processor unit(s) 1010 and main memory 1020 are connected via a local microprocessor bus, and the mass data storage 1030, peripheral device(s) 1080, portable storage device 1040, and graphics display system 1070 are connected via one or more input/output (I/O) buses.

Mass data storage 1030, which can be implemented with a magnetic disk drive, solid state drive, or an optical disk drive, is a non-volatile storage device for storing data and instructions for use by processor unit(s) 1010. Mass data storage 1030 stores the system software for implementing embodiments of the present disclosure for purposes of loading that software into main memory 1020.

Portable storage device 1040 operates in conjunction with a portable non-volatile storage medium, such as a flash drive, floppy disk, compact disk, digital video disc, or Universal Serial Bus (USB) storage device, to input and output data and code to and from the computer system 1000 in FIG. 10. The system software for implementing embodiments of the present disclosure is stored on such a portable medium and input to the computer system 1000 via the portable storage device 1040.

User input devices 1060 can provide a portion of a user interface. User input devices 1060 may include one or more microphones, an alphanumeric keypad, such as a keyboard, for inputting alphanumeric and other information, or a pointing device, such as a mouse, a trackball, stylus, or cursor direction keys. User input devices 1060 can also include a touchscreen. Additionally, the computer system 1000 as shown in FIG. 10 includes output devices 1050. Suitable output devices 1050 include speakers, printers, network interfaces, and monitors.

Graphics display system 1070 include a liquid crystal display (LCD) or other suitable display device. Graphics display system 1070 is configurable to receive textual and graphical information and processes the information for output to the display device. Peripheral device(s) 1080 may include any type of computer support device to add additional functionality to the computer system.

Some of the components provided in the computer system 1000 in FIG. 10 can be those typically found in computer systems that may be suitable for use with embodiments of the present disclosure and are intended to represent a broad category of such computer components. Thus, the computer system 1000 in FIG. 10 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including MAC OS, UNIX, LINUX, WINDOWS, PALM OS, QNX, ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 1000 may be implemented as a cloud-based computing environment, such as a virtual machine operating within a computing cloud. In other embodiments, the computing system 1000 may itself include a cloud-based computing environment, where the functionalities of the computing system 1000 are executed in a distributed fashion. Thus, the computing system 1000, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 1000, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, e.g., optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, e.g., a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as PYTHON, RUBY, JAVASCRIPT, JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for providing integration of application performance monitoring data with logs data and infrastructure data for data visualization and analysis, the method comprising:
   automatically correlating three data sources associated with execution of an application, the three data sources including logs data from one or more services invoked for the execution, infrastructure associated with the execution, along with application performance monitoring (APM) trace information indicating in real time at least execution time information for the one or more services;
   providing a separate user interface (UI) for at least the logs data, infrastructure, and APM trace information data sources for data visualization and analysis;
   for the separate UIs for at least the infrastructure and APM trace information correlated data sources, providing a menu for selecting one of the other correlated data sources associated with the other UIs;
   in response to a menu selection by a user, causing display of the other correlated data source and corresponding UI to the user, such that the user can debug an issue involved with the execution of the application; and
   providing, in the separate UI for the logs data source, a plurality of fields for linking to different ones of the separate UIs, so as to enable the user to jump from the separate UI for the logs data source to others of the separate UIs, wherein the plurality of fields are predefined or user selectable;
   wherein the plurality of fields includes a first field linked to separate APM trace data source UI, a second field linked to the relevant container metrics in the separate infrastructure data source UI, and a third field linked to the relevant host metrics in separate infrastructure data source UI.

2. The computer-implemented method of claim 1, wherein the separate infrastructure correlated data source UI provides for selection of a plurality of metrics for display.

3. The computer-implemented method of claim 2, wherein the separate infrastructure correlated data source UI includes an icon for each of a plurality of containers or an icon for each of a plurality of hosts.

4. The computer-implemented method of claim 3, further comprising, in response to selection of one of the plurality of metrics on the separate infrastructure correlated data source UI, causing display of the selected metric for each of the plurality of containers or for each of the plurality of hosts.

5. The computer-implemented method of claim 4, further comprising causing the menu for the separate infrastructure correlated data source UI to be displayed in response to selection of one of the icons for the plurality of containers or plurality of hosts.

6. The computer-implemented method of claim 5, wherein the menu for the separate infrastructure correlated data source UI includes viewing logs, viewing graphics of a plurality of metrics, and viewing APM traces for the container or host corresponding to the selected icon.

7. The computer-implemented method of claim 5, further comprising, in response to selection of viewing graphics for the plurality of metrics on the menu, causing display of a plurality of metric graphs including a CPU usage graph, a memory usage graph, a network traffic graph, and a disk I/O graph.

8. The computer-implemented method of claim 4, wherein the plurality of selectable metrics includes CPU usage, memory usage, network traffic and disk I/O and the display of the selected metric is a percentage or value.

9. The computer-implemented method of claim 1, further comprising, an enabling selection of a trace by a user, and in response to the selection of the trace, causing display of the menu for the separate APM trace information correlated data source UI.

10. The computer-implemented method of claim 9, wherein the menu for the separate APM trace information correlated data source UI includes a plurality of selectable actions including showing data for the other data sources.

11. The computer-implemented method of claim 10, further comprising, in response to user selection of one of the plurality of selectable actions, causing display of the selected data via the separate UI for the selected other data source.

12. The computer-implemented method of claim 10, wherein the plurality of selectable actions includes showing container logs, showing host logs, showing container metrics, and showing host metrics.

13. The computer-implemented method of claim 1, wherein the separate UI for the APM trace information data source includes a distributed trace linking in real time each of the one of more services to one another over time.

14. The computer-implemented method of claim 1, further comprising storing and indexing of the three data sources.

15. The computer-implemented method of claim 1, wherein each of the separate UIs include a search field for filtering the corresponding data.

16. A system comprising:
a processor; and
a memory communicatively coupled to the processor, the memory storing instructions executable by the processor to perform a method for integration of application performance monitoring with logs and infrastructure data, the method comprising:
automatically correlating three data sources associated with execution of an application, the three data sources including logs data from one or more services invoked for the execution, infrastructure associated with the execution, and application performance monitoring (APM) trace information indicating in real time at least execution time information for the one or more services;
providing a separate user interface (UI) for at least the logs data, infrastructure, and APM trace information data sources for data visualization and analysis;
for the separate UIs for at least the infrastructure and APM trace information correlated data sources, providing a menu for selecting one of the other correlated data sources associated with the other UIs;
in response to a menu selection by a user, causing display of the other correlated data source and corresponding UI to the user, such that the user can debug an issue involved with the execution of the application; and
providing, in the separate UI for the logs data source, a plurality of fields for linking to different ones of the separate UIs, so as to enable the user to jump from the separate UI for the logs data source to others of the separate UIs, wherein the plurality of fields are predefined or user selectable;
wherein the plurality of fields includes a first field linked to separate APM trace data source UI, a second field linked to the relevant container metrics in the separate infrastructure data source UI, and a third field linked to the relevant host metrics in separate infrastructure data source UI.

17. A computer-implemented method for providing integration of logs data, infrastructure data, and application performance monitoring data in a microservices architecture, the method comprising:
automatically correlating data sources associated with execution of an application, the data sources associated with the execution including logs data from services invoked, infrastructure data, and application performance monitoring (APM) trace information that indicates in real time at least execution time information for the services;
providing a separate user interface (UI) for each of the correlated data sources for visualization and data analysis;
for the separate UIs for at least the infrastructure and APM trace information correlated data sources, providing a menu for selecting one of the other correlated data sources associated with the other UIs;
in response to a menu selection by a user, causing display of the other correlated data source and corresponding UI to the user, such that the user can debug an issue involved with the execution of the application; and
providing, in the separate UI for the logs data source, a plurality of fields for linking to different ones of the separate UIs, so as to enable the user to jump from the separate UI for the logs data source to others of the separate UIs, wherein the plurality of fields are predefined or user selectable;
wherein the plurality of fields includes a first field linked to separate APM trace data source UI, a second field linked to the relevant container metrics in the separate infrastructure data source UI, and a third field linked to the relevant host metrics in separate infrastructure data source UI.

\* \* \* \* \*